(12) United States Patent
Loverich et al.

(10) Patent No.: US 8,635,916 B1
(45) Date of Patent: Jan. 28, 2014

(54) INTERNAL STRUCTURAL MONITORING SYSTEM

(76) Inventors: Jacob Loverich, State Colleg, PA (US); Stephen J. Wenner, Port Matilda, PA (US); Jeremy E. Frank, Pine Grove Mills, PA (US)

( * ) Notice: Subject to any disclaimer, the term of this patent is extended or adjusted under 35 U.S.C. 154(b) by 139 days.

(21) Appl. No.: 13/176,959

(22) Filed: Jul. 6, 2011

Related U.S. Application Data

(60) Provisional application No. 61/361,723, filed on Jul. 6, 2010.

(51) Int. Cl.
*G01L 1/00* (2006.01)

(52) U.S. Cl.
USPC ............................................................ 73/768

(58) Field of Classification Search
CPC ...................................................... G01B 7/16
USPC .................................. 73/768; 340/539.1, 679
See application file for complete search history.

(56) References Cited

U.S. PATENT DOCUMENTS

| | | | | |
|---|---|---|---|---|
| 3,336,795 A * | 8/1967 | Arakawa | ................. | 73/862.339 |
| 4,838,077 A * | 6/1989 | Shifflet et al. | .............. | 73/115.05 |
| 6,304,176 B1 * | 10/2001 | Discenzo | ................. | 340/539.26 |
| 7,256,505 B2 * | 8/2007 | Arms et al. | .................... | 290/1 R |
| 7,276,703 B2 * | 10/2007 | Berkcan et al. | ............ | 250/358.1 |
| 7,698,962 B2 * | 4/2010 | LeFebvre et al. | ........ | 73/862.621 |
| 7,719,416 B2 * | 5/2010 | Arms et al. | ................. | 340/539.1 |
| 7,860,664 B2 * | 12/2010 | Loomis et al. | ................... | 702/35 |
| 8,024,980 B2 * | 9/2011 | Arms et al. | ..................... | 73/763 |
| 8,253,587 B2 * | 8/2012 | Andarawis et al. | ...... | 340/870.16 |
| 8,344,912 B2 * | 1/2013 | Mitchell et al. | ............... | 340/973 |
| 2008/0163670 A1 * | 7/2008 | Georgeson | .................... | 73/23.31 |
| 2010/0050778 A1 * | 3/2010 | Herley et al. | ................... | 73/761 |

* cited by examiner

*Primary Examiner* — Lisa Caputo
*Assistant Examiner* — Octavia Davis-Hollington
(74) *Attorney, Agent, or Firm* — John J. Elnitski, Jr.

(57) ABSTRACT

An internal structural monitoring system for a structure that includes a sensor mounted within the structure to measure at least one of strain experienced by the structure and vibration experience by the structure. It includes a first system support mounted and second system support mounted in the structure, where the first system and the second system support are mounted in the structure such that the sensor is between the first system support and the second system support to hold the sensor in position so that the sensor senses at least one of strain and vibration. It includes a wireless communication unit mounted within the structure, the wireless communication unit connected to the sensor to receive data from the sensor and transmit the data to a receiver outside the structure. It includes a power supply mounted within the structure to supply necessary electrical power to the sensor and the communication unit.

25 Claims, 9 Drawing Sheets

INTERNAL STRUCTURAL MONITORING SYSTEM

This application claims the benefit of and incorporates by reference U.S. Provisional Application No. 61/361,723 filed Jul. 6, 2010.

This invention was made with United States government support under U.S. Navy SBIR Award No. N68335-09-C-0176. The government has certain rights in this invention.

BACKGROUND OF THE INVENTION

The present invention relates generally to structural monitoring systems, and more particularly to monitoring systems embedded within a structure that includes autonomous power supplies, sensors, and wireless communication.

Structural monitoring is a known field used to examine the integrity of structures and predict when maintenance activities should be performed. Most conventional prior art in this field pertains to sensor systems which use sensors that are wired to a central data acquisition and processing unit. Structural monitoring systems have been applied historically in situations where the cost to benefit ratio is low, because the sensor systems add significant cost, additional maintenance requirements, and a level of reliability that may not coincide with that of the structural system being monitored. For example, health monitoring sensors in power plants are often used because common failures cost millions of dollars in down time, while bridge monitoring sensors are not typically employed because bridges rarely fail and sensor installations are costly. The cost-benefit ratio for each application depends on both the cost savings that can be derived from early failure prediction and the lifecycle cost of the particular implementations of the structural monitoring system. The lifecycle cost for most monitoring systems is in large part determined by the wired connections between remote sensor locations and a central data acquisition and processing unit. Wiring faults are common and are often difficult to diagnose, which increases the maintenance required to sustain the monitoring system. Wire installation costs are high because the wire often needs to be protected.

In addition to wiring, the typical external mounting and means of attachment of a monitoring device to a structure strongly influences their accuracy, performance stability and ultimately lifecycle cost of such devices. Small degradation in adhesives or mechanical fastener boundary conditions due to corrosion leads to changes in the operation of sensor and power supply, which can radically compromise the value that they offer. Changes to the sensor mount may require recalibration of device, which erodes the maintenance reduction objectives of the monitoring system. Changes to the power supply mount can affect output, which compromises the performance of the whole monitoring system. External mounting of sensor systems presents further drawbacks in terms of vulnerability to external damage or tampering.

In the specific case of helicopter components such as rod ends, replacement is often initiated by the appearance of damage and blemishes in the external surface of the structural part. These blemishes may result from impacts with small debris during operation or from maintenance activities in the proximity of the structural part. Considering the robustness of metal components relative to the vulnerability of an externally mounted device of a monitoring system, there is an issue of whether the devices of the monitoring system must be replaced more often than the structure that is being monitored.

A common problem with prior load sensors such as wire foil strain gauges is induced noise from external electromagnetic sources. Foil strain gauges can behave similar to an antenna, because they are typically exposed and mounted to a metal component. This is a particularly relevant issue in structural monitoring systems, if wireless communication and wireless power transfer is used.

It is an object of the present invention to provide a structural monitoring system which can be embedded in a structure.

It is an object of the present invention to provide a structural monitoring system which does not require wired connections for power or communication.

It is an object of the present invention to provide a structural monitoring system with improved system robustness and reduced susceptibility to tampering.

It is an object of the present invention to provide a structural monitoring system with reduced maintenance and improved useful life of the monitoring system.

SUMMARY OF THE INVENTION

An internal structural monitoring system for a structure that includes a sensor mounted within the structure to measure at least one of strain experienced by the structure and vibration experience by the structure. It includes a first system support mounted and second system support mounted in the structure, where the first system and the second system support are mounted in the structure such that the sensor is between the first system support and the second system support to hold the sensor in position so that the sensor senses at least one of strain and vibration. It includes a wireless communication unit mounted within the structure, the wireless communication unit connected to the sensor to receive data from the sensor and transmit the data to a receiver outside the structure. It includes a power supply mounted within the structure to supply necessary electrical power to the sensor and the communication unit.

DETAILED DESCRIPTION

Figure 1:
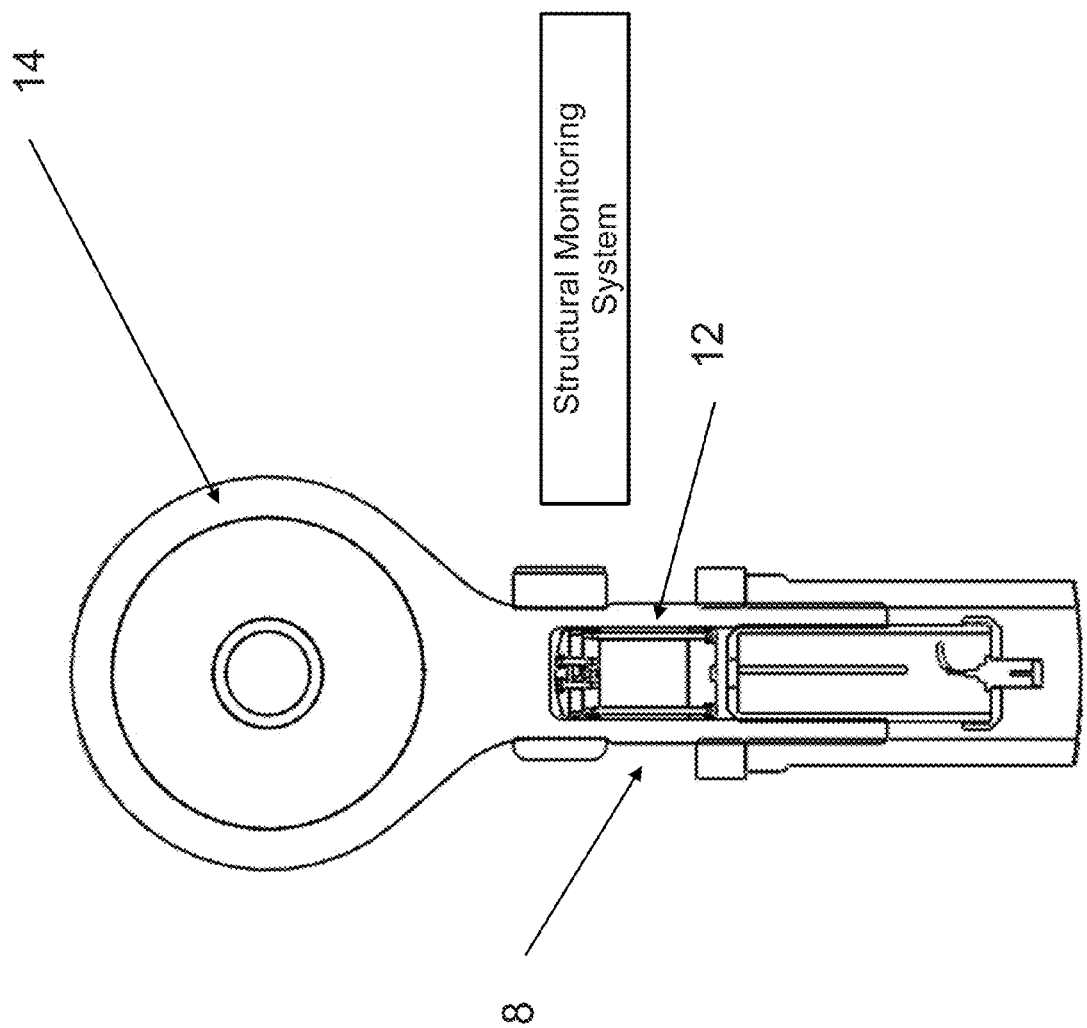
FIG. 1 is a schematic front view of an internal structural monitoring system embedded in a rod end according to the present invention.

The present invention is an internal structural monitoring system 8 for a structure as shown in FIG. 1. The present invention includes apparatus and methods associated with the internal structural monitoring system. The present invention includes structure modification and methods of how to modify a structure to receive the internal structural monitoring system. The present invention includes devices as part of the internal structural monitoring system, how to install the devices of internal structural monitoring system within a structure and how to use devices of the internal structural monitoring system within a structure. It further includes features to enable autonomous functionality without the use of wired connectivity to a central processing unit.

The present invention provides an autonomous internal monitoring system that interrogates a structure or conditions to which the structure is subject. The present invention provides for measuring parameters which characterize a structure's condition, use, or exposure to its operational environment without the use of external wires for power and communication. Such structural monitoring is used in support of maintenance activities. Structural monitoring is also used for evaluation of safety or control of a structure's use and performance. For example, monitoring of loading experienced by rod ends that are port of rods which interconnect components on helicopter main rotor assembly provides essential information regarding the accumulation of damage to the rotor assembly. Knowing the accumulation of damage can help determine the optimal time at which rotor assembly components should be replaced to maintain a high level of safety, while minimizing vehicle maintenance cost. In this specific example, structural monitoring provides an essential basis for generating value in terms of reductions in schedule and unscheduled maintenance, reduced work load, minimization of down time, and increased safety.

The present invention provides for the use of low power sensors and wireless features for use in structural monitoring that can be used in a broader range of applications, while reducing the monitoring system cost-benefit ratio. The low power consumption by a sensor, allows the internal structural monitoring system to be powered over a long period of time by devices such as small batteries or energy harvesters that derive energy from their surroundings. Wireless features reduce the high liability of hardwiring devices of the internal structural monitoring system.

Figure 2:
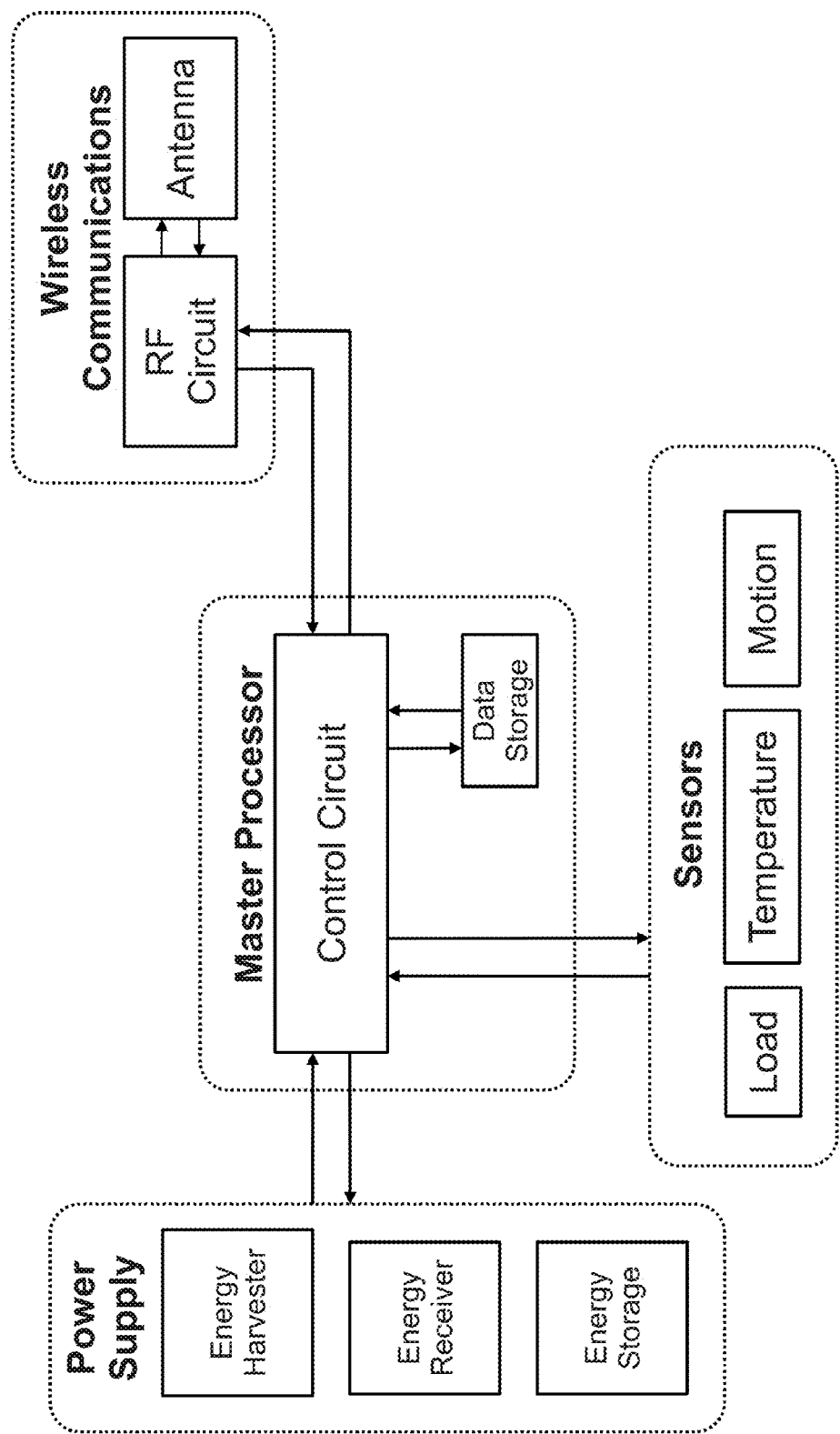
FIG. 2 is a schematic representation of an internal structural monitoring system according to the present invention.

The present invention includes four primary subsystems of devices, which include a sensor unit, master control circuit, wireless communication unit, and power supply, as shown in FIG. 2. These subsystems function integrally for realizing the benefits of monitoring of structures while they are in use. The sensor unit includes one or more sensors to interrogate the structure and environment surrounding the structure, in order to determine the structure's condition, use, or exposure to its environment. The sensors interface with the master control circuit for control and data acquisition. Analysis and data compression of the sensor measurements is performed at the master control circuit, which includes a processor for such duties. The master control circuit communicates with the wireless communication unit to deliver the structure's use data to a remote receiver location. The sensor measurements are also stored locally in data storage at the master control circuit. The power supply uses energy harvester transducers, energy receivers, and energy storage devices to power the internal structural monitoring system. The energy harvesters convert energy related to the structure's use or environment to electrical energy. During times when the structure is not in use or is stationary and statically loaded, communication to or from the sensor may be required. The present invention provides for energy to be supplied to the internal structural monitoring system using wireless energy transfer or an energy storage unit. Energy generated or received can be accumulated or permanently stored in the energy storage unit, if available.

The term "structure" refers to the physical object that is the primary subject that the internal structural monitoring system monitors and interrogates. FIG. 2 shows a schematic of a monitoring system according to the present invention. FIG. 2 shows the four primary subsystems of a sensor unit, master control circuit, wireless communication unit, and power supply. The embedding of the devices of these subsystems within the structure and their corresponding particular implementations are part of the present invention. It is desirable to have the four subsystems collocated or tethered together in a close proximity of one another for various reasons. The sensor unit includes one or more sensors that measure motion, temperature, strain and load on the structure. Motions can include vibration and acceleration. The master control circuit controls and communicates with each of the other subsystems. The master control circuit includes an analog/digital (A/D) interface and digital input/output (I/O) for interfacing with the sensors, wireless radio and flash memory for data storage. The wireless communication unit provides a wireless data link to a remote location and includes a wireless radio and an antenna. Control and data transmission to the radio is dictated by the master control circuit. The power supply functions to deliver and regulate electrical energy to all other subsystems. The power supply can include an energy harvester, wireless power receiver and energy storage unit. The implementation of each subsystem is described using an application for helicopter components as an example. Specifically, the example shows the use of the internal structural monitoring system in rod ends of rods that are used as linkages.

Figure 3:
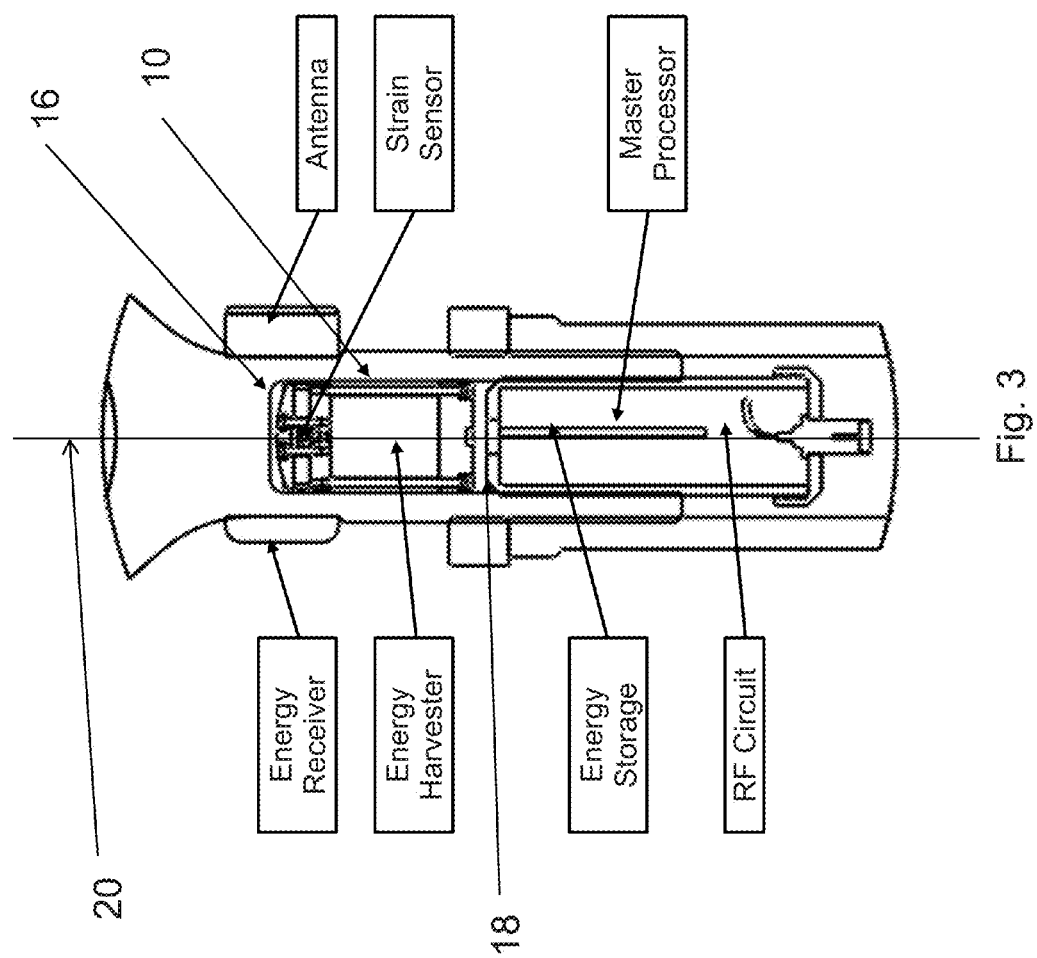
FIG. 3 is a schematic representation of an internal structural monitoring system embedded in a rod end according to the present invention.

FIG. 1 shows a schematic drawing of a rod end extending from the rod with the internal structural monitoring system embedded within a cavity 10 of a rod end shaft 12 of the rod end. The rod end is an ideal platform for the internal monitoring system. This is because the rod ends are located at critical load links on main rotor dampers, pitch links or push rod assemblies of a helicopter. Together, the internal structural monitoring system in the rod end supplement existing helicopter Health and Usage Monitoring Systems (HUMS) by providing near real time load data on the rotor assembly. Since the rod end is a common aircraft component, the internal structural monitoring system is applicable to other locations on aircraft including landing gear. Rod ends are also used as structural components on many other types of vehicles and structures. The rod is usually a round tubular shape, but the rod could be other shapes. The rod end includes an eye 14 used as a connection point to other structural components. The rod end when connected to a rod is considered as the end of the rod. Extending from the eye is the rod end shaft 12. The rod end shaft 12 connects to the rod and is typically threaded into an opening in the rod. The rod end shaft 12 of the present invention includes the cavity 10 to receive the internal monitoring system. FIG. 3 shows a closer view of the internal structural monitoring system in the rod end and how it can be applied to any type of structure that is designed to primarily receive axial loads. Example structures designed to primarily receive axial loads include rods, beams, tubes, struts, cables, and trusses. The structure to receive the internal structural monitoring system should include some type of cavity to receive and enclose the internal structural monitoring system. FIG. 3 shows a strain sensor, energy harvester, energy storage, master control circuit and RF circuit within the cavity 10 of the axial body rod shaft 12 of the rod end. On the outside of the axial body is an energy receiver that is linked to the energy storage of the power supply and an antenna that is linked to the RF circuit of the wireless communication unit.

Figure 4:
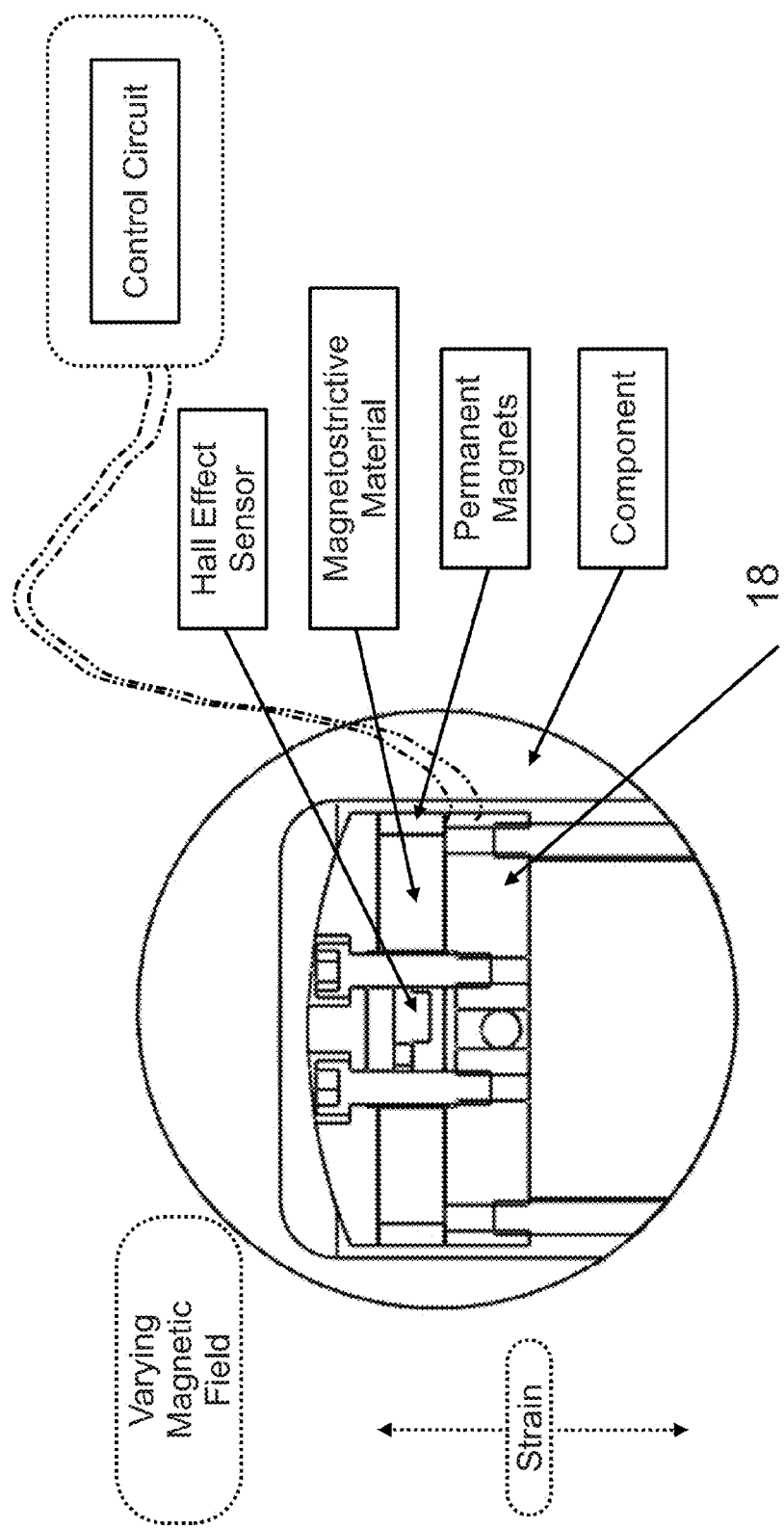
FIG. 4 is a schematic representation of a load sensor embedded in a structure according to the present invention.

FIG. 4 shows a detailed schematic view of a load sensor used as the strain sensor shown in FIG. 3. FIG. 4 is one of many types of strain sensors that could be used. The load sensor is shown as a cylindrical shape within a cylindrical cavity of the rod end. The load sensor is placed against the closed end 16 of the cylindrical cavity 10 which acts as a first system support. The load sensor is held in place with the closed end 16 and a second system support 18, as shown in FIG. 3. The load is applied along the axis of symmetry 20 of the cylindrical cavity 10 from the close end of the cylindrical cavity 10 downward towards the second system support 18. Elongation or retraction of the structure about the cylindrical cavity 10 will be registered as strain along axis of symmetry 20. The distance between the first system support 16 and the second system support 18 can be such that the load sensor is under a state of compression between the first system support 16 and the second system support 18. The second system support 18 is mounted in the cylindrical cavity such that the second system support 18 moves with the structure along the axis of symmetry 20. Because both the strain sensor and the structure have elastic compliance, a nominal state of compression on the load sensor enables it to register bidirectional loading. Compression of the load sensor is preferably greater than the maximum tensile load that is intended to be measured. The alignment of the center axis of the load sensor with the center axis of the cylindrical structure, enables accurate load measurements even if bending moments are introduced perpendicular to the structure's axis of symmetry. This is as opposed to sensor solutions mounted externally that require multiple sensing locations and averaging algorithms to deduce the uniaxial loading. Spherical contacts at the top and/or bottom of the load sensor prevent transfer of bending from the structure to the load sensor.

The sensor shown in FIG. 4 as an example uses a unique an axi-symmetric magnetostrictive element and magnetic field sensor. The magnetic field sensor is shown as a Hall effect element for sensing changes in the magnetic field. FIG. 4 shows the Hall effect sensor mounted in the center of a cylindrical magnetostrictive element and permanent magnets located about the sides of the cylindrical magnetostrictive element. Changes in the load on the magnetostrictive element, cause changes the magnetic field in the proximity of the Hall effect sensor. The Hall effect sensor provides an electrical signal that is related to the magnetic field to which it is exposed. The sensor has a ferromagnetic housing mounted about the cylindrical magnetostrictive element. The ferromagnetic housing acts as a shield to protect against changes in the magnetic environment around the load sensor including the proximity of ferromagnetic materials and other passive or active magnets which can strongly influence the load sensor's sensitivity. For example, if the load sensor is mounted in a rod end on a helicopter and the load sensor passes large steel fasteners as the blades rotate, the sensitivity could vary, if susceptible to external magnetic environments because of lack of shielding. Because both the stiffness of the magnetostrictive element and magnetostrictive responses of the magnetic field are nonlinear, it is advantageous to have their nonlinearity oppose each other. In this case, the magnetic field change due to displacement change of the magnetostrictive element tends to negate the high sensitivity of the magnetostricitve material for small strains. For large strains, the deflection contribution is minimal and the magnetostrictive material is less sensitive to displacement change in this region, which results in greater linearity over a wide range of strains.

Figure 5:
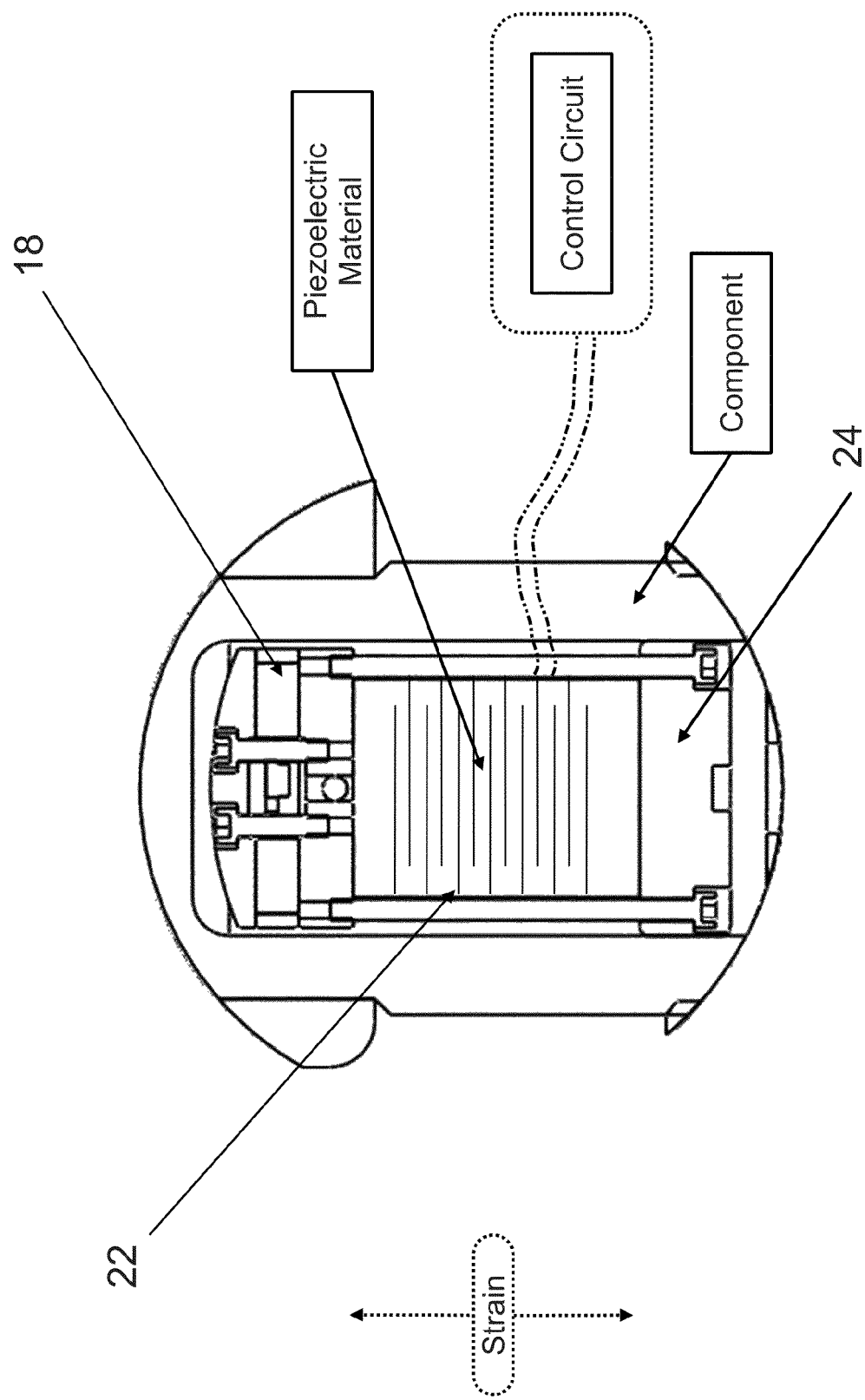
FIG. 5 is a schematic representation of a piezoelectric energy harvester embedded in a structure according to the present invention.

FIG. 5 shows an example of an energy harvester power supply 22. The energy harvester 22 shown in FIG. 5 is a piezoelectric energy harvester with piezoelectric material. In this design, a piezoelectric transducer is directly attached or embedded in the host structure, where the host structure is the cylindrical cavity 10 of the rod end. The energy harvester 22 is positioned between the second system support 18 and a third system support 24 within the shaft 12 of the rod end. The second system support 18 and a third system 24 support hold the energy harvester 22 in position, so that straining of the rod end causes the piezoelectric material of piezoelectric element to strain with the rod end. Both the second system support 18 and a third system support 24 can be positioned in the cylindrical cavity 10 by threading them into a helical thread located on the inside of the cylindrical cavity 10. Both the second system support 18 and a third system support 24 can be a fastener with outside threads. There can be the case where the bottom surface of the sensor acts as the second system support and the energy harvester 22 is positioned against the sensor, so that the sensor and the energy harvester 22 are between only the first system support 16 and third system support 24. Other methods than threads can be used to mount the system supports 16, 18 within the host structure. Strain induced in the piezoelectric element in turn generates electrical charge at electrodes connected to the piezoelectric element. The charge is extracted by the master control circuit so it can be delivered to other electrical devices of the internal structural monitoring system. Since the electric field generated in the piezoelectric material is roughly proportional to strain, the voltage output of the piezoelectric device is controlled by its thickness dimension. To maintain useable voltages without adding large step-down converters to the power management circuitry, the piezoelectric thickness must be small. Thin piezoelectric layers are stacked to increase the strain energy in the piezoelectric material which in turn increases the power generation capability of the energy harvester 22. The piezoelectric stack element is coupled mechanically to the rod end by placing it under a preload using the surrounding structure of the cylindrical cavity 10, the second system support 18 and a third system support 24. In this way, the piezoelectric element is in parallel with the primary stiffness of the rod end. Similarly to the load sensor, compression of the piezoelectric element between second system support 18 and a third system support 24 is preferably greater than the maximum tensile load that the rod end is designed to accommodate. The stack is preferably a cylindrical element fitted into the cylindrical cavity 10 in the structure. The stack can be ring shaped with a hollow center. It is preferably between 1 and 50 mm long and between 5 and 50 mm in outside diameter.

Figure 6:
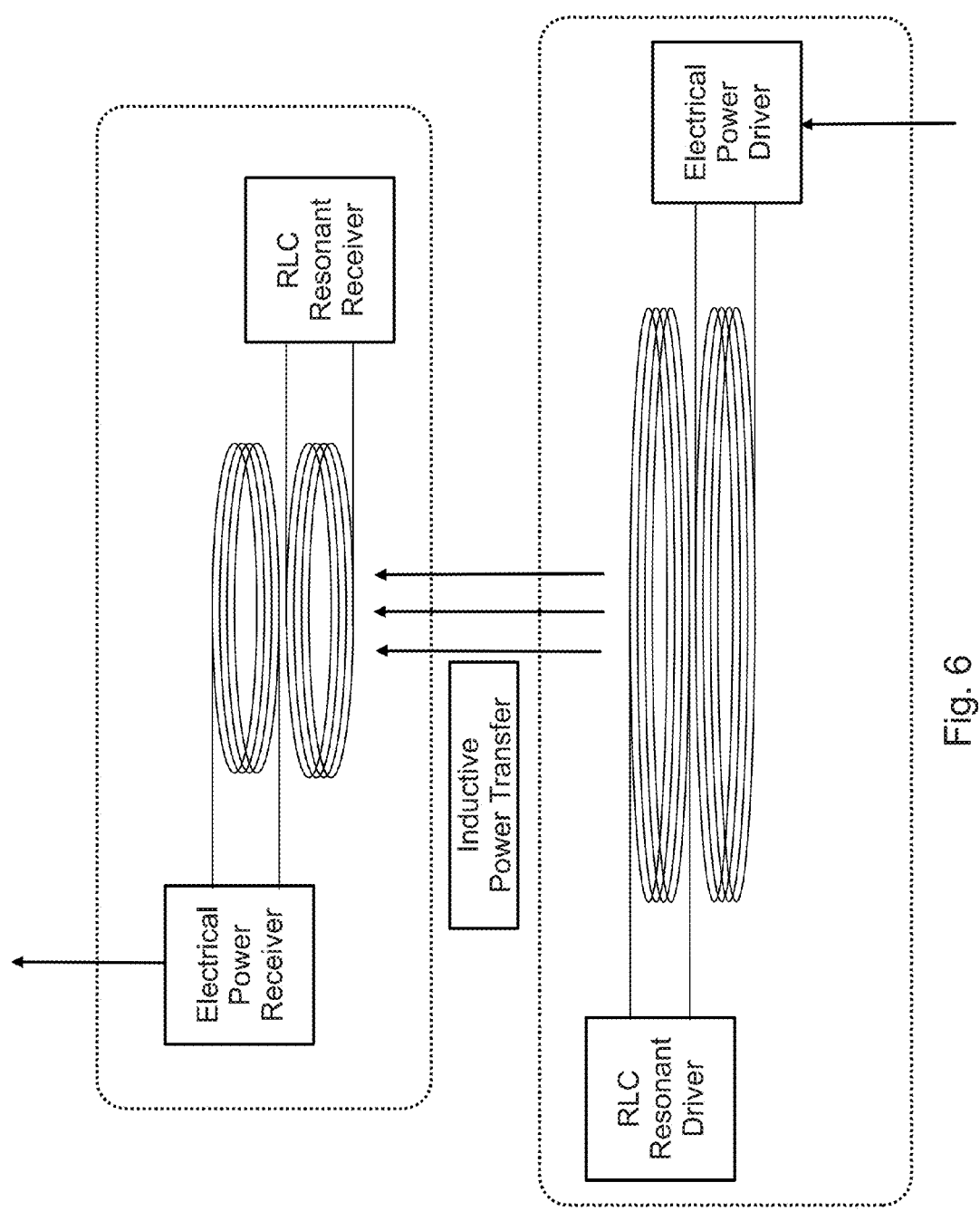
FIG. 6 is a schematic representation of an inductive coupling for wireless power transfer according to the present invention.
Figure 7:
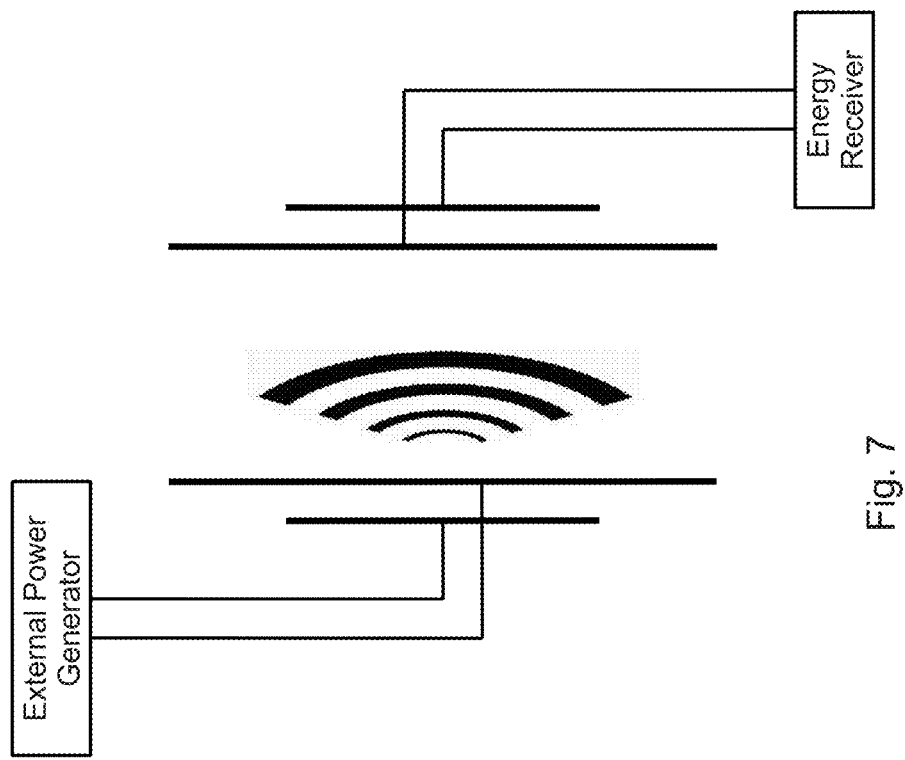
FIG. 7 is a schematic representation of an approach for electromagnetic radiation power transfer according to the present invention.

Information recorded about the structure remains with the structure due to the internal structural monitoring system being embedded within the structure. In this case, removing the structure of the rod end from its assembly will not disassociate it from the recorded data. This is important for air and land vehicle components that are periodically removed, refurbished and may remain in storage for a period of time. Since retrieval of recorded information from the sensor depends on the operation of the energy harvesting power supply, the power harvester must be subject to its intended environment. When a structure with an embedded sensor and energy harvester is in storage or removed from its assembly, the energy harvester is likely to be completely inert, making it difficult to extract recorded information from the structure. This is an issue because one of the main purposes of embedded sensors is to evaluate if a structure can be returned to service. In this case, energy must be delivered to the sensor system while it is not in its intended assembly. Since the sensor system is embedded and wireless, a wired connection for power would not be the most convenient solution. Energy delivery by wireless methods provides a simpler solution. FIG. 6 shows an inductive coupling method that is used to transfer energy from an external source using a resonant driver to a tuned resonant receiver that is part of the internal structural monitoring system. Inductive coupling as depicted in FIG. 6 involves generating a periodic magnetic field at the source and harnessing the electromotive force defined by Faraday's law to provide an electrical current in a receiving electrically conductive element. By adding capacitance to the receiving inductive receiving element, electrical resonance is used to amplify the impedance load and the power transfer. The power transfer is also enhanced for a given system by adding an additional set of electromagnetic resonators between the delivering and receiving coils. These resonators provide an impedance match condition that enables efficient power transfer in a compact package. FIG. 7 shows a secondary power transfer method that uses an alternating electric field to deliver power from an external power generator to an energy receiver. This is generally achieved using electromagnetic radiation in the far field where the magnetic and electric fields are in phase. The electric field is generally initiated and received by antennas. Resonance is used to amplify the response of the antennas. The antennas include various topology including helical, Yagi, half wave dipole, quarter wave dipole, patch, collinear, conformal, fractal, aperture, etc.

Figure 8:
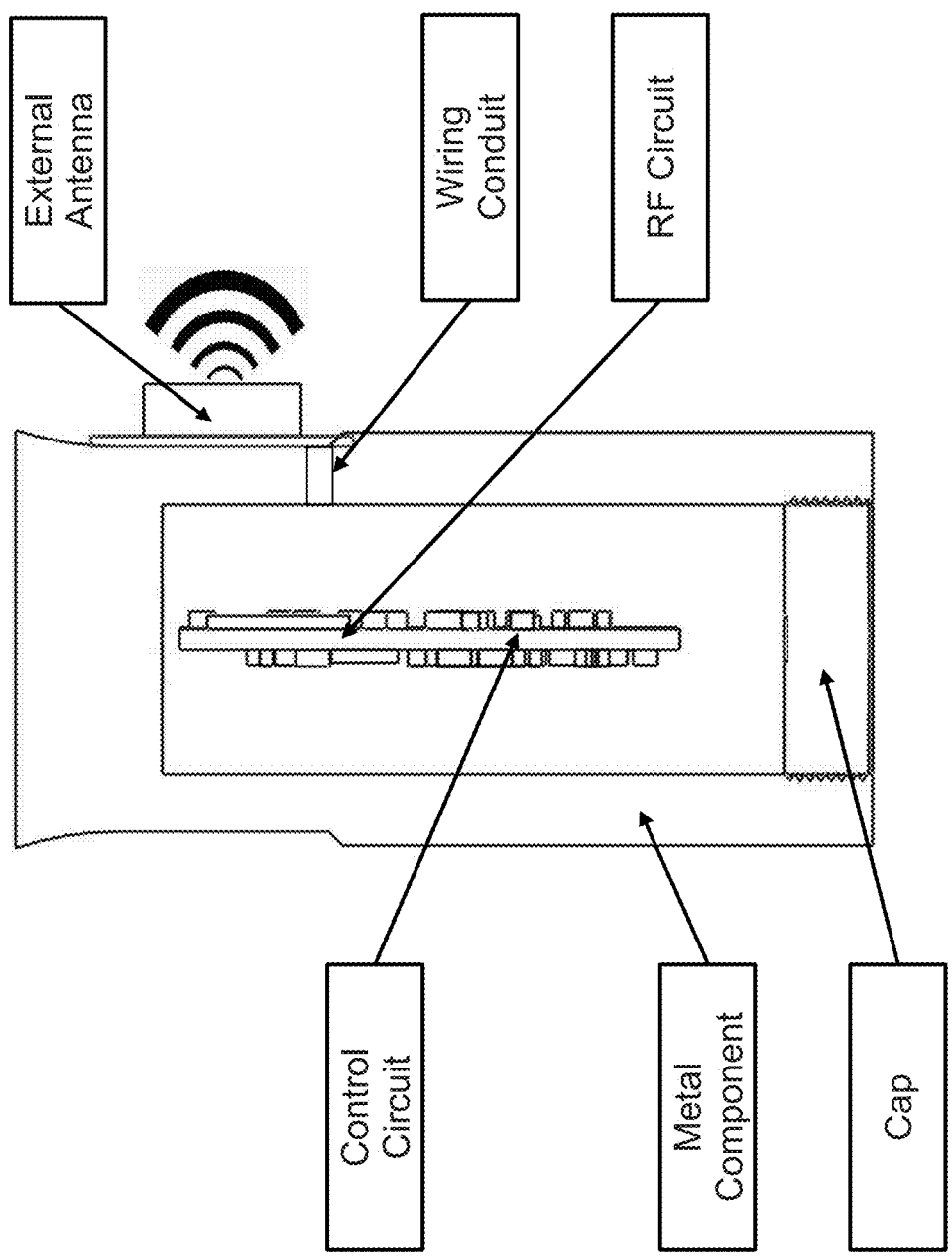
FIG. 8 is a schematic representation of an antenna mounted external to a structure according to the present invention.
Figure 9:
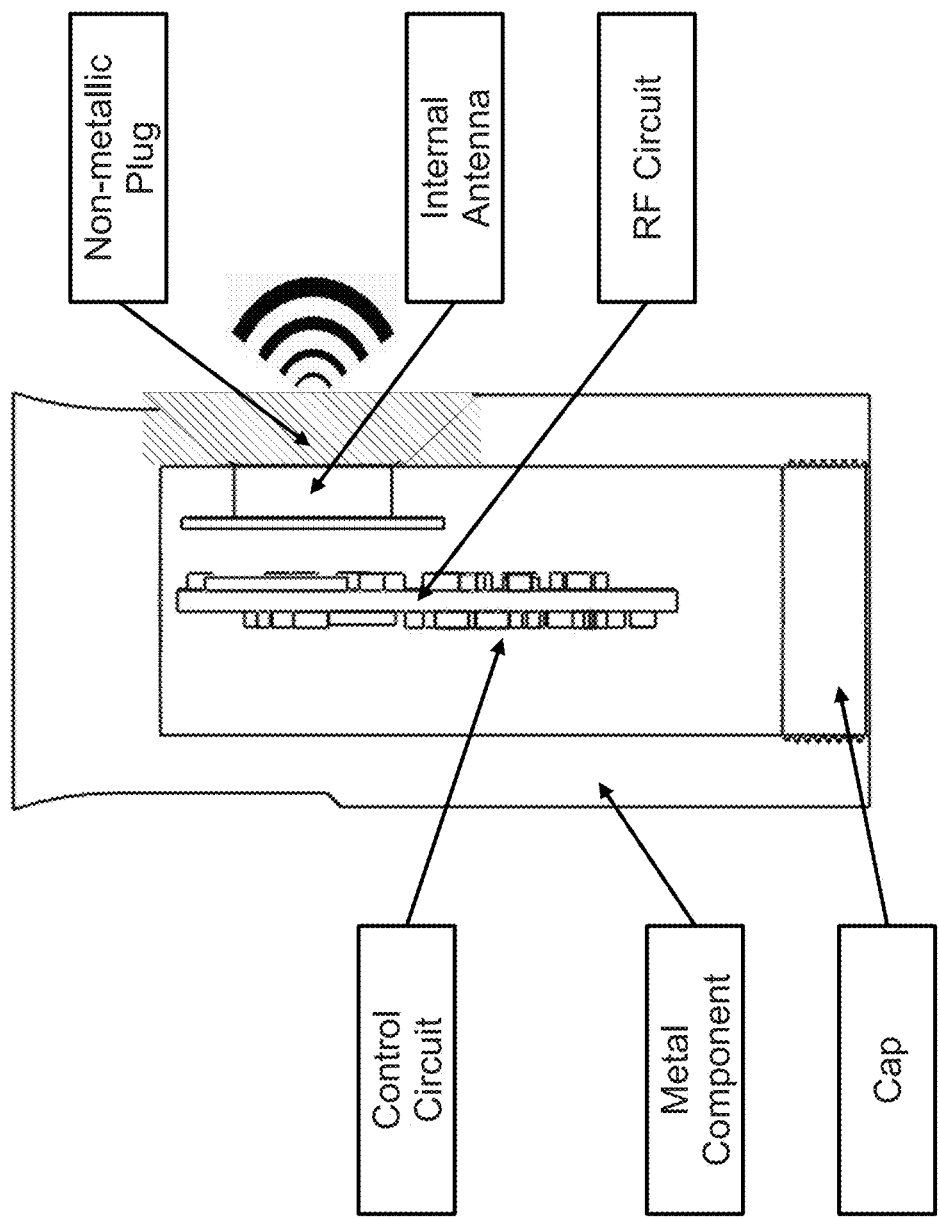
FIG. 9 is a schematic representation of an antenna embedded in a structure according to the present invention.

Both the electromagnetic receiver for energy and the RF communication components, including antennas, require an unimpeded path for delivering or receiving electromagnetic radiation. The structure is typically fabricated out of electrically conductive materials, which inhibit line of site radiation. One solution is to use an antenna external to the structure. This requires a small port through the structure to connect the antenna to the electrical components that are embedded within the structure. FIG. 8 shows an external antenna and a wiring conduit as the small port. FIG. 9 shows another solution by having a plug with a low electrically conductivity to enable the antenna components to be embedded and still deliver and receive electromagnetic radiation. The communication antenna and electromagnetic energy receiver are preferably potted or enclosed in packages having low electrical conductivity.

The present invention allows for monitoring structures in support of maintenance, control, or safety evaluations or activities related to the structure. The present invention allows for sensing parameters relevant to monitoring the structure's use, condition, or exposure to its environment. The present invention allows for storing the sensed parameters at or near the measurement location on the structure. The present invention compresses and analyzes the measured parameters to extract useful information pertaining to the structure's use, condition, or exposure. The present invention transmits useful information wirelessly from the monitoring location to a remote receiver. The present invention allows for harvesting energy and supplying it to the monitoring system for operation when the structure's use or environment surrounding the structure provides an opportunity to generate energy. The present invention receives energy wirelessly from an external source or from an energy storage unit when the use or environment surrounding the structure provides an insufficient opportunity to generate energy.

The present invention addresses essential features lacking in prior state-of-the-art monitoring systems. In particular, it addresses the robustness and long term reliability issues described herein. The approach to addressing these issues involves integration of the sensor system directly with the host structure rather than simply attaching it to the host structure as is common in the prior art. The integration influences the particular implementation of each of the subsystems. It improves the performance of both the sensor and the energy harvester. It also reduces cost by eliminating expensive manufacturing steps associated with bonded piezoelectric fiber composites and foil strain gauges. The system reduces maintenance costs associated with the monitoring system by providing a platform that does not require periodic calibration or repair due to rigorous use. With these advancements, autonomous sensor nodes render a low cost and highly reliable structural monitoring solution, thereby expanding the opportunities for structural monitoring to a wide range of applications on vehicles, buildings, and other basic civilian infrastructure.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

We claim:

1. An internal structural monitoring system for a structure, comprising:
    a sensor mounted within said structure to measure at least one of strain experienced by said structure and vibration experience by said structure;
    a first system support mounted in said structure;
    a second system support mounted in said structure:
    said first system support and said second system support positioned and mounted in said structure such that said sensor is between said first system support and said second system support to hold said sensor in position so that said sensor senses at least one of strain and vibration;
    a wireless communication unit mounted within said structure, said wireless communication unit connected to said sensor to receive data from said sensor and transmit said data to a receiver outside said structure;
    a power supply mounted within said structure to supply necessary electrical power to said sensor and said communication unit, and
    wherein said structure is a shaft extending from another structural part and wherein said internal structural monitoring system is embedded within said shaft.

2. The internal structural monitoring system of claim 1, wherein said power supply includes storage for electrical energy.

3. The internal structural monitoring system of claim 2, further including a wireless electrical energy receiver in said structure to receiver energy from an external source and wherein said storage is connected to said wireless electrical energy receiver.

4. The internal structural monitoring system of claim 3, wherein said structure is a rod end; wherein said rod end includes an eye used as a connection point to other structural components; wherein said rod end includes a rod end shaft extending from said eye; and wherein said internal structural monitoring system is embedded with said rod end shaft.

5. The internal structural monitoring system of claim 4, wherein said sensor is aligned axially along a length of said rod end shaft so that said sensor experiences strain and vibrations that is experienced at said eye of said rod end.

6. The internal structural monitoring system of claim 2, wherein said structure is a rod end; wherein said rod end includes an eye used as a connection point to other structural components; wherein said rod end includes a rod end shaft extending from said eye; and wherein said internal structural monitoring system is embedded with said rod end shaft.

7. The internal structural monitoring system of claim 1, wherein said structure is a rod end; wherein said rod end includes an eye used as a connection point to other structural components; wherein said rod end includes a rod end shaft extending from said eye; and wherein said internal structural monitoring system is embedded with said rod end shaft.

8. The internal structural monitoring system of claim 7, wherein said sensor is aligned axially along a length of said rod end shaft so that said sensor experiences strain and vibrations that is experienced at said eye of said rod end.

9. The internal structural monitoring system of claim 8, wherein said sensor is a load sensor that includes an axisymmetric magnetostrictive element and a semiconductor based Hall effect element, said Hall effect element mounted in the center of said magnetostrictive element.

10. The internal structural monitoring system of claim 7, wherein said sensor is a load sensor that includes an axisymmetric magnetostrictive element and a magnetic field sensor, said magnetic field sensor mounted in the center of said magnetostrictive element.

11. The internal structural monitoring system of claim 7, further including an energy harvester mounted within said structure as part of said power supply and wherein said energy harvester is a piezoelectric energy harvester which includes piezoelectric transducers directly attached and embedded to form a piezoelectric element in said structure.

12. An internal structural monitoring system for a structure, comprising
a sensor mounted within said structure to measure at least one of strain experienced by said structure and vibration experience by said structure;
a first system support mounted in said structure;
a second system support mounted in said structure:
said first system support and said second system support positioned and mounted in said structure such that said sensor is between said first system support and said second system support to hold said sensor in position so that said sensor senses at least one of strain and vibration;
a wireless communication unit mounted within said structure, said wireless communication unit connected to said sensor to receive data from said sensor and transmit said data to a receiver outside said structure;
a power supply mounted within said structure to supply necessary electrical power to said sensor and said communication unit; and
wherein said first system support and said second system support are each separately connected to the structure so that each of said first system support and said second system support move separately with strain on said structure to aid in said sensor to sense at least one of strain and vibration from said structure.

13. The internal structural monitoring system of claim 12, further including an energy harvester mounted within said structure as part of said power supply.

14. The internal structural monitoring system of claim 13, further including a third system support mounted in said structure; wherein said energy harvester is mounted between said third system support and one of said first system support and said second system support; and wherein said energy harvester is mounted within said structure such that said third system support and one of said first system support and said second system support maintains said energy harvester in position in said structure so that said energy harvester can receive at least one of strain and vibration from said structure.

15. The internal structural monitoring system of claim 14, wherein said structure is a rod end; wherein said rod end includes an eye used as a connection point to other structural components; wherein said rod end includes a rod end shaft extending from said eye; and wherein said internal structural monitoring system is embedded with said rod end shaft.

16. The internal structural monitoring system of claim 15, wherein said sensor is aligned axially along a length of said rod end shaft so that said sensor experiences strain and vibrations that is experienced at said eye of said rod end.

17. The internal structural monitoring system of claim 13, wherein said energy harvester is a piezoelectric energy harvester which includes piezoelectric transducers directly attached and embedded to form a piezoelectric element in said structure.

18. The internal structural monitoring system of claim 12, wherein said first system support and said second system support are positioned and mounted in said structure such that said sensor is compressed between said first system support and said second system support so that said sensor remains in contact with said first system support and said second system support when sensing at least one of strain and vibration from said structure.

19. The internal structural monitoring system of claim 18, wherein said structure is a rod end; wherein said rod end includes an eye used as a connection point to other structural components; wherein said rod end includes a rod end shaft extending from said eye; and wherein said internal structural monitoring system is embedded with said rod end shaft.

20. The internal structural monitoring system of claim 12, wherein said structure is a rod end; wherein said rod end includes an eye used as a connection point to other structural components; wherein said rod end includes a rod end shaft extending from said eye; and wherein said internal structural monitoring system is embedded with said rod end shaft.

21. An internal structural monitoring system for a structure, comprising
a sensor mounted within said structure to measure at least one of strain experienced by said structure and vibration experience by said structure;
a first system support mounted in said structure;
a second system support mounted in said structure:
said first system support and said second system support positioned and mounted in said structure such that said sensor is between said first system support and said second system support to hold said sensor in position so that said sensor senses at least one of strain and vibration;
a wireless communication unit mounted within said structure, said wireless communication unit connected to said sensor to receive data from said sensor and transmit said data to a receiver outside said structure;
a power supply mounted within said structure to supply necessary electrical power to said sensor and said communication unit;
an energy harvester mounted within said structure as part of said power supply;
a third system support mounted in said structure; wherein said energy harvester is mounted between said third system support and one of said first system support and said second system support; and wherein said energy harvester is mounted within said structure such that said third system support and one of said first system support and said second system support maintains said energy harvester in position in said structure so that said energy harvester can receive at least one of strain and vibration from said structure; and wherein said third system support and one of said first system support and said second system support used with said energy harvester are each separately connected to the structure so that said third system support and one of said first system support and said second system support used with said energy harvester can separately experience at least one of strain and vibration experienced by said structure to aid in said energy harvester to experience at least one of strain and vibration experienced by said structure.

22. The internal structural monitoring system of claim 21, wherein said energy harvester is remains in contact with said third system support and one of said first system support and said second system support used with said energy harvester so that said energy harvester experiences at least one of strain and vibration experienced by said structure.

23. The internal structural monitoring system of claim 22, wherein said structure is a rod end; wherein said rod end includes an eye used as a connection point to other structural components; wherein said rod end includes a rod end shaft extending from said eye; and wherein said internal structural monitoring system is embedded with said rod end shaft.

24. The internal structural monitoring system of claim 21, wherein said structure is a rod end; wherein said rod end includes an eye used as a connection point to other structural components; wherein said rod end includes a rod end shaft extending from said eye; and wherein said internal structural monitoring system is embedded with said rod end shaft.

25. An internal structural monitoring system for a structure, comprising
 a sensor mounted within said structure to measure at least one of strain experienced by said structure and vibration experience by said structure;
 a first system support mounted in said structure;
 a second system support mounted in said structure:
 said first system support and said second system support positioned and mounted in said structure such that said sensor is between said first system support and said second system support to hold said sensor in position so that said sensor senses at least one of strain and vibration;
 a wireless communication unit mounted within said structure, said wireless communication unit connected to said sensor to receive data from said sensor and transmit said data to a receiver outside said structure;
 a power supply mounted within said structure to supply necessary electrical power to said sensor and said communication unit; and
 wherein said sensor is a load sensor that includes an axisymmetric magnetostrictive element and a magnetic field sensor, said magnetic field sensor mounted in the center of said magnetostrictive element.

* * * * *